United States Patent

[11] 3,587,888

| [72] | Inventor | William H. Warren<br>Pleasant St., West Brookfield, Mass. 01585 |
| --- | --- | --- |
| [21] | Appl. No. | 803,709 |
| [22] | Filed | Mar. 3, 1969 |
| [45] | Patented | June 28, 1971 |

[54] TRANSFERRING HORIZONTAL BATCHES OF ARTICLES TO A DIFFERENT LEVEL
6 Claims, 3 Drawing Figs.

[52] U.S. Cl. .................................. 214/146.5, 214/309, 214/1, 214/147
[51] Int. Cl. .................................................. B66c 23/00
[50] Field of Search............................. 214/309, 147 (T), 1 (B-4), 1 (B.S-4), 146.5

[56] References Cited
UNITED STATES PATENTS

| 1,835,579 | 12/1931 | Westin | 214/1(B-4) |
| 2,832,478 | 4/1958 | Malewicz et al. | 214/1(B-4) |
| 3,067,966 | 12/1962 | Hicks | (214/146.5UX) |
| 3,069,035 | 12/1962 | Schwarz et al. | 214/309 |

Primary Examiner—Albert J. Makay
Attorney—Charles R. Fay

ABSTRACT: Means picking up vertically a plurality of articles in a horizontal formation and transferring them in a batch to a different level while still horizontal and depositing the articles vertically.

TRANSFERRING HORIZONTAL BATCHES OF ARTICLES TO A DIFFERENT LEVEL

BACKGROUND OF THE INVENTION

One time and labor consuming transfers of articles resides in transferring eggs from a conveyor at one level to a conveyor at a different level. When this is attempted to be done mechanically several serious problems develop. The most practical way to transfer eggs is by suction chucks arrange in rows, so that a large number of eggs are moved at once, but where the levels at pickup and delivery are different, a simple swinging transfer mechanism moving on an arc between stations on the same level as exemplified in my copending application Ser. No. 615,692 filed Feb. 13, 1967 would tend to break some eggs as the chucks encounter and deliver the eggs at an inclined path of the chuck motion relative to the eggs when operating on different levels, and this tends to push or pull the eggs sideways.

SUMMARY OF THE INVENTION

This invention provides a swinging arm carrying a plate having a plurality of egg chucks thereon, the arm being capable of lengthening and shorting, being preferably telescopic, and having guiding cams providing an arcuate path for the arm to transfer the eggs, the cam however having vertical end portions so that the plate and chucks move vertically only at the ends of travel along the arc, thus bringing the chucks vertically to the eggs at the pickup, and also providing a vertical motion at the other end of the arc, to release the eggs, so that the chucks are not moved on the arc at either the pickup or the discharge stations.

PREFERRED EMBODIMENT OF THE INVENTION

Figure 1:
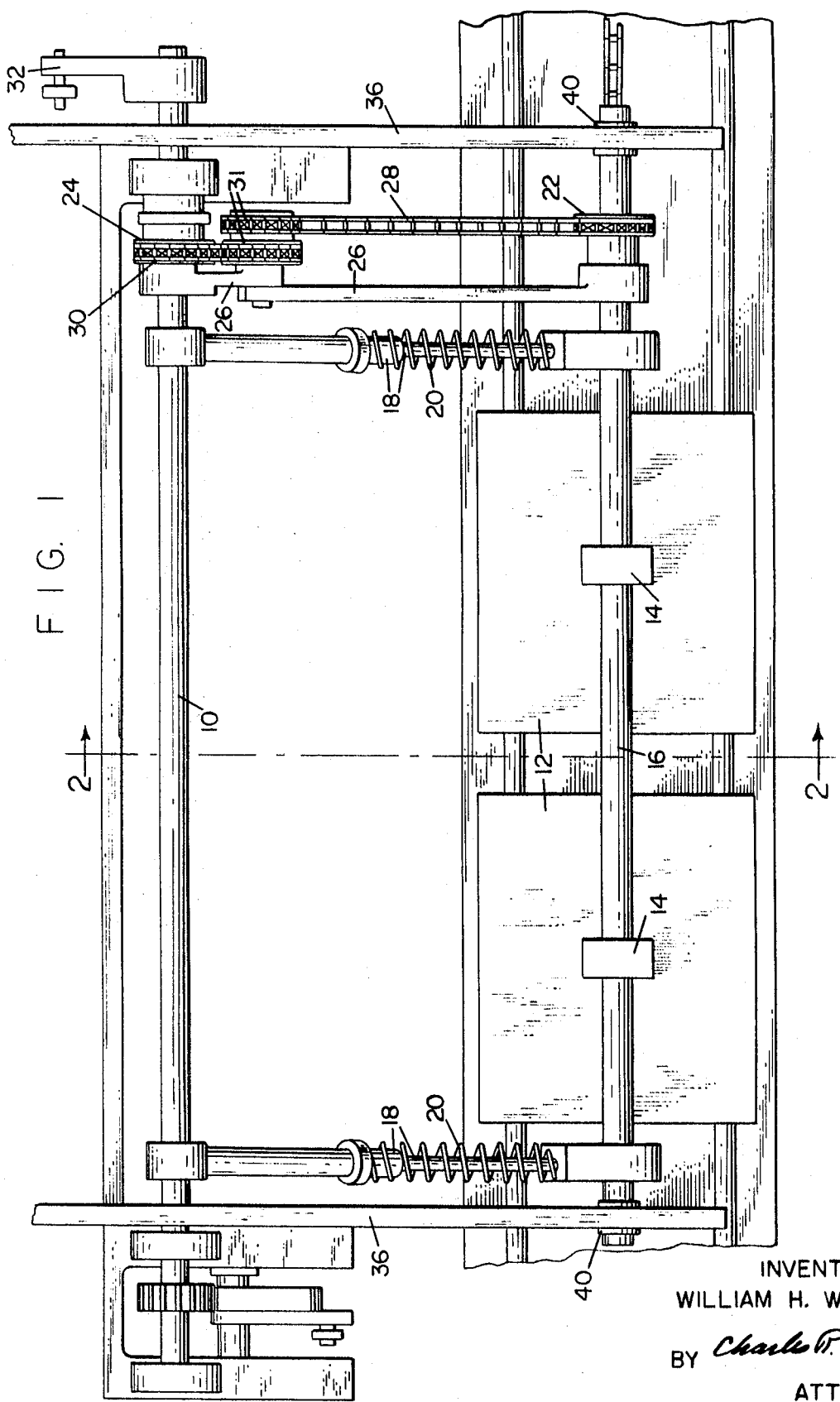
FIG. 1 is a top plan view of the novel apparatus.

An oscillating shaft 10 is mounted in convenient manner in a frame. This shaft is oscillated the required amount to move egg chuck plates 12, 12 between pickup and a delivery station. The plates 12, 12 are pivoted by brackets 14 on a supporting rod 16 carried by arms 18, 18 that are telescopic so that they can lengthen and shorten. The arms are provided with balance springs 20, 20 that tend to hold the arms at a midpoint but which yield in both directions to allow stretching and retraction. The rod 16 is maintained in fixed orientation relative to the horizontal, and thus maintains the plates 12, 12 in the same relation, by fixed sprockets 22 and 24, jointed arms 26, 26 and chains 28 and 30, the latter being trained over like sprockets 31. The shaft 10 is oscillated by any desired mechanism such as a crank lever. The numeral 32 in FIG. 1 indicates a counterweight.

Figure 2:
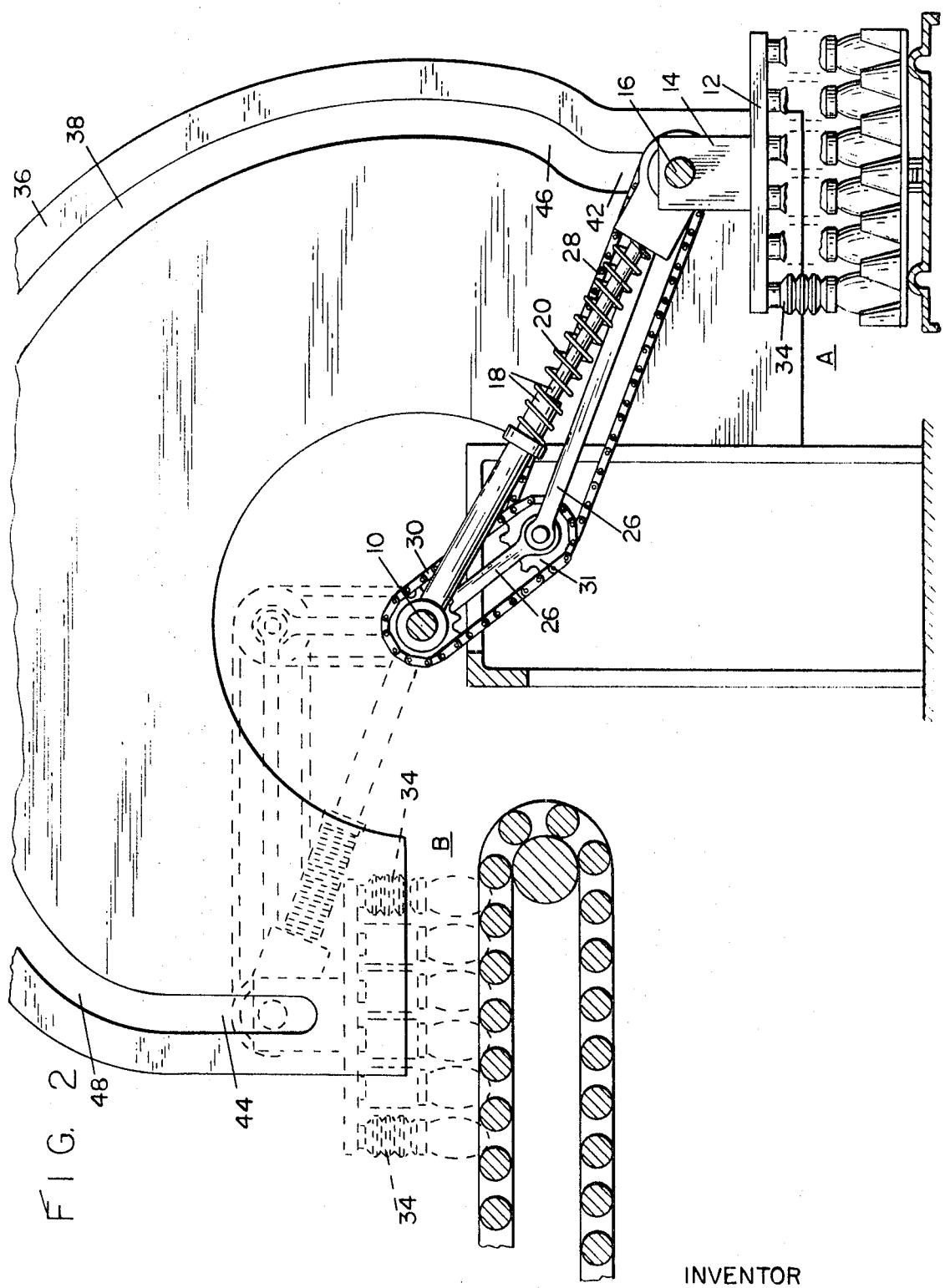
FIG. 2 is a section on line 2-2 of FIG. 1.

Referring to FIG. 2, a pick up station is represented at A and a delivery station B on a higher level. It is clear that since stations A and B are at different levels, the egg chucks 34, if moved only on an arc about shaft 10, would be moving to the left to some degree at station B, and this would disturb and sometimes break the eggs and result in imperfect operation of the chucks.

Figure 3:
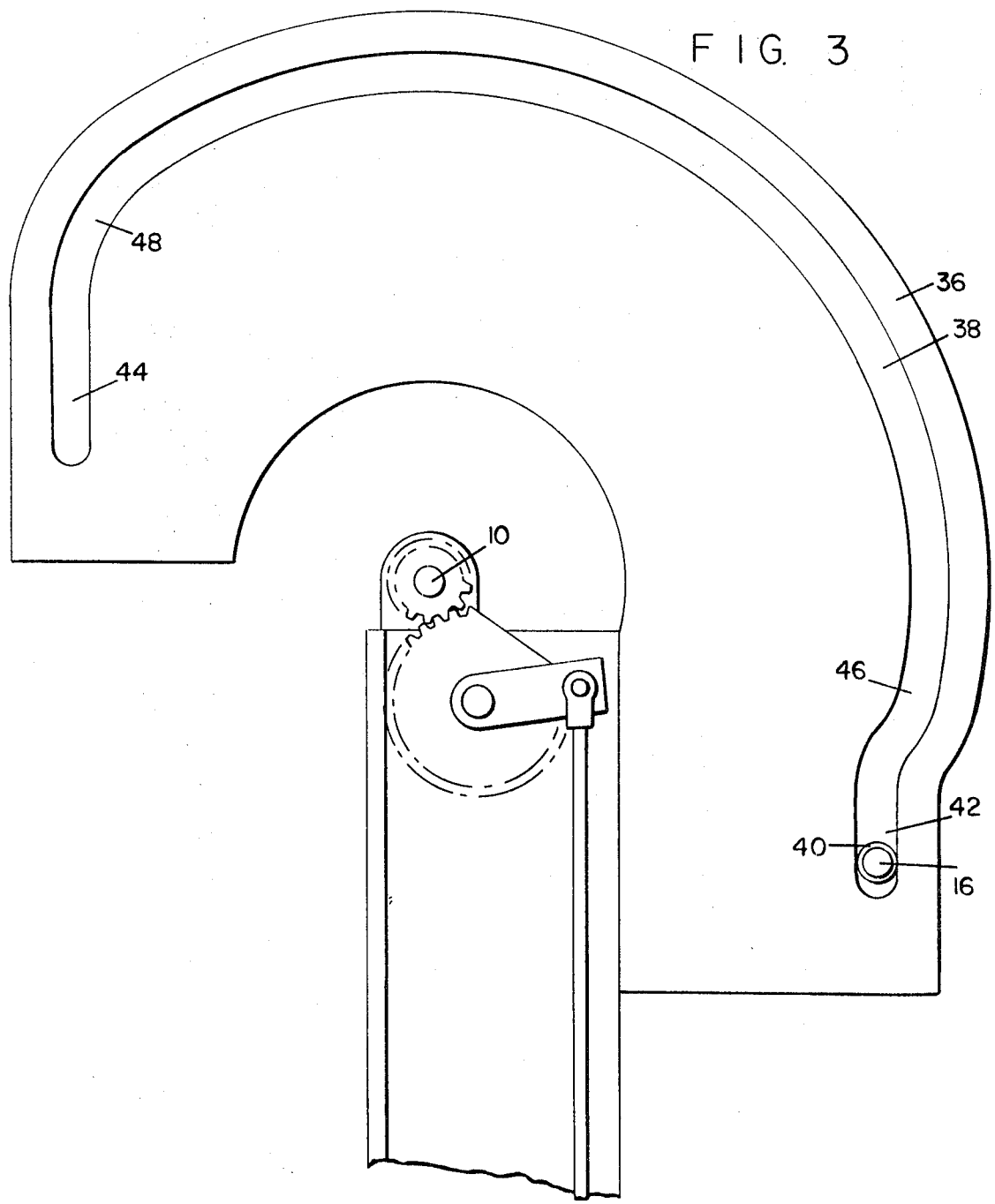
FIG. 3 is an elevation showing the cam structure.

A pair of vertical supports 36 of any convenient sort are provided with cam slots 38, FIG. 3, receiving cam followers 40 on the end portions of rod 16. The cam slots are arcuate at the intermediate portions thereof which comprise the greatest parts of their lengths, but at their ends they are vertical as at 42 and 44. This causes the chuck plates to move vertically at these areas while still remaining horizontal. This action will be clear from the representation in FIG. 2 wherein a chuck plate 12 is shown at station A in solid lines and at station B in dotted lines. The motion of this plate, under influence of oscillatory shaft 10, is vertically upwards from the solid line showing until vertical cam slot portion runs into the arcuate portion at 46, thence along the arc (preferably a part of a circle) until it reaches the point 48, and then vertically downwardly. The arms 18 are at their longest at station A and at their shortest at station B.

I claim:

1. Article-transfer device comprising a loading station and a delivery station, means to pick up articles at the loading station, an oscillating arm to travel the pickup means to the delivery station for deposit of the articles,
   and means guiding the pickup means in its path of travel along a curve for a portion of the length thereof from one station to the other, said guiding means being constructed and arranged to restrict the path of travel of the pickup means to a generally straight line at at least one end portion of the path of travel of the pickup means, said arm being extensible axially to conform with the requirements of the guiding means.

2. The article-transfer device of claim 1 including means to maintain the pickup means in a predetermined orientation relative to the horizontal, there being a plurality of individual article-holding devices on the pickup means, and means at the pickup station to support a plurality of articles to be picked up simultaneously in a horizontal plane by said article-holding devices.

3. The article-transfer device of claim 1 wherein said arm is extensible axially to conform with the requirements of the guiding means.

4. The article-transfer device of claim 1 wherein said arm is contractable as well as extensible axially to conform with the requirements of the guiding means.

5. The article-transfer device of claim 1 wherein said arm is contractable as well as extensible axially to conform with the requirements of the guiding means, and including a pair of relatively axially movable parts, and an extension-compression spring between the parts of the arm tending to maintain the same in an intermediate position.

6. The article-transfer device of claim 1 wherein the loading and delivery stations are at different levels, and the arm is extensible and contractable to conform to the requirements of the guiding arms.